US008527089B2

(12) United States Patent
Meacock et al.

(10) Patent No.: US 8,527,089 B2
(45) Date of Patent: Sep. 3, 2013

(54) DISPENSING MACHINE

(75) Inventors: David Meacock, Basingstoke (GB); Neil Harrington, Basingstoke (GB)

(73) Assignee: Mars, Inc., McLean, VA (US)

( * ) Notice: Subject to any disclaimer, the term of this patent is extended or adjusted under 35 U.S.C. 154(b) by 192 days.

(21) Appl. No.: 13/054,820

(22) PCT Filed: Jul. 21, 2009

(86) PCT No.: PCT/GB2009/001795
§ 371 (c)(1), (2), (4) Date: Jun. 13, 2011

(87) PCT Pub. No.: WO2010/010335
PCT Pub. Date: Jan. 28, 2010

(65) Prior Publication Data

US 2011/0233228 A1 Sep. 29, 2011

(30) Foreign Application Priority Data

Jul. 22, 2008 (GB) .................................. 0813437.1

(51) Int. Cl.
*G06F 17/00* (2006.01)

(52) U.S. Cl.
USPC ............................ 700/236; 700/242; 221/155

(58) Field of Classification Search
USPC .......................... 700/232, 236, 242; 221/155
See application file for complete search history.

(56) References Cited

U.S. PATENT DOCUMENTS

| | | | | |
|---|---|---|---|---|
| 5,562,232 | A * | 10/1996 | Pearson | 221/7 |
| 5,748,485 | A * | 5/1998 | Christiansen et al. | 700/234 |
| 5,822,216 | A * | 10/1998 | Satchell et al. | 700/232 |
| 5,831,862 | A * | 11/1998 | Hetrick et al. | 700/232 |
| 7,258,249 | B1 | 8/2007 | Frederick et al. | |
| 7,490,054 | B2 * | 2/2009 | Reade et al. | 705/16 |
| 7,783,381 | B2 * | 8/2010 | Walker et al. | 700/240 |
| 7,881,822 | B2 * | 2/2011 | Thornton et al. | 700/244 |
| 7,950,817 | B2 * | 5/2011 | Zulim et al. | 362/125 |
| 8,082,061 | B2 * | 12/2011 | Segal et al. | 700/232 |
| 8,170,713 | B2 * | 5/2012 | Levasseur et al. | 700/232 |

FOREIGN PATENT DOCUMENTS

| | | | |
|---|---|---|---|
| EP | 1783705 | A2 | 5/2007 |
| GB | 353890 | A | 7/1931 |
| GB | 2432580 | A | 5/2007 |

* cited by examiner

*Primary Examiner* — Timothy Waggoner
(74) *Attorney, Agent, or Firm* — Norton Rose Fulbright

(57) ABSTRACT

A dispensing machine for dispensing items to customers comprising a cabinet having at least one window, a plurality of supports for supporting a plurality of different items to be dispensed to customers, a pointing device for selecting a desired item from the plurality of items, an indicator associated with the pointing device and operable to provide an indication, visible through the window, of which item is being selected by the pointing device without dispensing said selected item, and a dispensing mechanism for dispensing the selected item in response to a dispensing instruction.

15 Claims, 7 Drawing Sheets

DISPENSING MACHINE

CROSS-REFERENCE TO RELATED APPLICATIONS

This Application is an National Phase application of PCT/GB2009/001795, filed Jul. 21, 2009, claiming priority from Application GB 0813437.1 filed on Jul. 22, 2008.

TECHNICAL FIELD

The present invention relates to a dispensing machine for dispensing items to customers.

BACKGROUND OF THE INVENTION

Dispensing machines are widely used for the dispensing of various items, e.g. snacks, drinks, newspapers and cards. They are typically installed in public areas such as train stations and office buildings.

The machine generally comprises a cabinet having one or more windows in a front wall thereof for viewing the items to be dispensed. The cabinet contains a number of different items; and associated with each item is a dispensing mechanism. The dispensing mechanism can for example be actuated to advance a selected item into a discharge area, from where it can be removed by the customer.

Typically, the machine further comprises a customer interface having a selection device for the customer to select a desired item. A dispensing machine for vending items to a customer, i.e. vending machine, typically has a coin/card slot on the customer interface for the customer to make payment for the selected item. Typically, the customer interface comprises a keypad for the customer to key in a number or code associated with the desired item.

FIG. 1 illustrates an exemplary dispensing machine (vending machine) 1 which contains a variety of items 10 to be dispensed. The items are stored behind a window of a cabinet. Each item 10 is retained on a shelf 20 by a dispensing apparatus (not shown) which is selectively actuatable to dispense the item into a discharge area 30 from where it can be removed by the customer. The vending machine further comprises a customer interface 40 positioned laterally of the window. The customer interface 40 comprises a coin slot 50 and a coin return recess 80, a banknote or bill insert slot 60 and a card acceptor 70 to initiate a vending operation. The customer interface 40 further comprises a keypad 90 with a display 95 to display prices of items, instructions for operating the machine, or other information to customers.

An exemplary dispensing apparatus of the above type comprises a dispensing spiral as disclosed in United Kingdom patent application GB2432580. The spiral vending machine has a plurality of parallel dispensing spirals located inside the cabinet and oriented with their axes substantially perpendicular to the window. Each spiral extends substantially from the back of each shelf to the front edge of the shelf and the rotation of the spiral advances the items in that spiral towards the front of the shelf, from where they drop into a discharge bin for collection by the customer.

GB-A-3535890 describes a vending machine with a display cabinet, a selection mechanism based on an electromechanical telephone dialling wheel, and a “selection indicator device” to indicate the item that has been selected by the selection mechanism. It is suggested that the selection indicating device could consist of a number of lamps each individually arranged to project a beam of light on a different product sample in the display cabinet. The selection indicating device in the GB patent is only activated after a selection has been made.

A disadvantage associated with a dispensing machine using a keypad or dialling wheel for selection is that it requires the customer to remember the item code that is displayed adjacent to the item inside the cabinet and then input the code using the keypad to make a selection. As the keypad or dialling wheel is typically positioned laterally of the window, the customer must look away from the item when making the selection. Thus, it is easy to make an unwanted or unsuccessful selection by keying in an incorrect item code. Furthermore, using keypads or telephone dialling wheels to make selections can also be somewhat slow.

Other selection devices have been designed for an improved selection. For example, electronic selection devices such as touch screens have been used for improving speed of selection. Such electronic selection devices generally require sensing circuitries to sense from the touch screen which command has been made by the customer and communicate this to a computer which will then process the command and control the dispensing mechanisms to dispense the corresponding item.

The touch screen may be positioned laterally of the window, where it is used in similar fashion to the keypad 90 shown in FIG. 1. It can also be positioned in other areas for making selection in a more direct manner. In particular, European patent application EP-A-1783705 discloses a vending machine having a selection device formed by a transparent touch screen attached to the outer surface of the product viewing window, the selection device comprising a sensor associated with the touch screen. The customer can make the selection by moving his/her hand close to the touch screen and/or touching it at the position of the desired item. The user then need not look away from the item he/she wishes to buy thus limiting selection errors. However, large-area transparent touch screens are expensive, and it is relatively easy to make an erroneous selection by accidentally touching the wrong part of the window.

Therefore, a need remains for a quicker and better controlled selection.

BRIEF SUMMARY OF THE INVENTION

The present invention has been devised to overcome the above-mentioned problems, providing a dispensing machine with a quick and better controlled selection performance.

In an aspect of the present invention, there is provided dispensing machine for dispensing items to customers, the dispensing machine comprising a cabinet having at least one window for viewing a plurality of different items to be dispensed to customers; a plurality of supports for supporting said plurality of different items to be dispensed to customers; a pointing device for selecting a desired item from the plurality of items; an indicator associated with the pointing device and operable to provide an indication, visible through the window, of which item is being selected by the pointing device without dispensing the selected item; and a dispensing mechanism for dispensing the selected item in response to a dispensing instruction.

In one embodiment, the dispensing machine further comprises a control system operably connected to the pointing device and the indicator, wherein the control system, in response to a signal from the pointing device, controls the indicator to provide an indication, visible through the window, of which item is being selected by the pointing device.

The term "pointing device" is used in its usual sense in the electronics hardware art. That is to say, it refers to a human interface device that allows a user to input spatial (i.e. continuous and multi-dimensional) data to a machine such as a computer using physical gestures. The pointing device may suitably comprise a roller ball, a touch pad, a touch sensitive transparent window, joystick, or pointing stick to control selection of the items.

In one embodiment, the indicator suitably comprises at least one illuminator to selectively illuminate the item selected by the pointing device. The illuminator may suitably comprise a downward facing light to illuminate the selected item from above. Alternatively or additionally, the illuminator may suitably comprise a forward facing light adjacent to the selected item. The light for illumination may comprise a LED.

In one embodiment, the machine further comprises a display for displaying information relating to the selected item or instructions for operating the machine. For example, the display may comprise a screen, such as a liquid crystal display screen, positioned laterally of the window(s).

In one embodiment, the dispensing machine is a spiral dispensing machine in which the dispensing mechanism comprises a plurality of dispensing spirals.

In another aspect of the present invention, there is provided method for operating a dispensing machine for dispensing items to customers, the method comprising using a pointing device to select a desired item, the selection comprising moving an indicator, wherein the indicator is operable to provide an indication, visible to customers through at least one window of the dispensing machine, to show which item is being selected by the pointing device; and dispensing a selected item in response to a dispensing instruction.

In one embodiment, the method further comprises browsing items through control of the pointing device.

In one embodiment, the indicator suitably provides an indication by illuminating the selected item.

In one embodiment, the method further comprises displaying information relating to the items or instructions for operating the machine to the customers.

As such, the present invention provides various advantages over the dispensing machines of the art. For example, using a pointing device instead of a keypad enables a quicker selection and provides more 'fun' of control. The user can browse the available products using the pointing means before making a selection. The localised illumination assists improving the accuracy of selection. It provides a clearer view of items to the customer and thus the customer may feel closer to items during selection. The localised illumination also provides visual appeal. In certain embodiments, the illumination may provide a static or dynamic illumination of different items in the machine when the machine is not being used, in order to increase the visual impact and appeal of the machine and thereby attract customers.

BRIEF DESCRIPTION OF THE DRAWINGS

Various embodiments of the present invention will now be described, by way of example, with reference to the accompanying drawings.

DETAILED DESCRIPTION OF THE INVENTION

Figure 1:
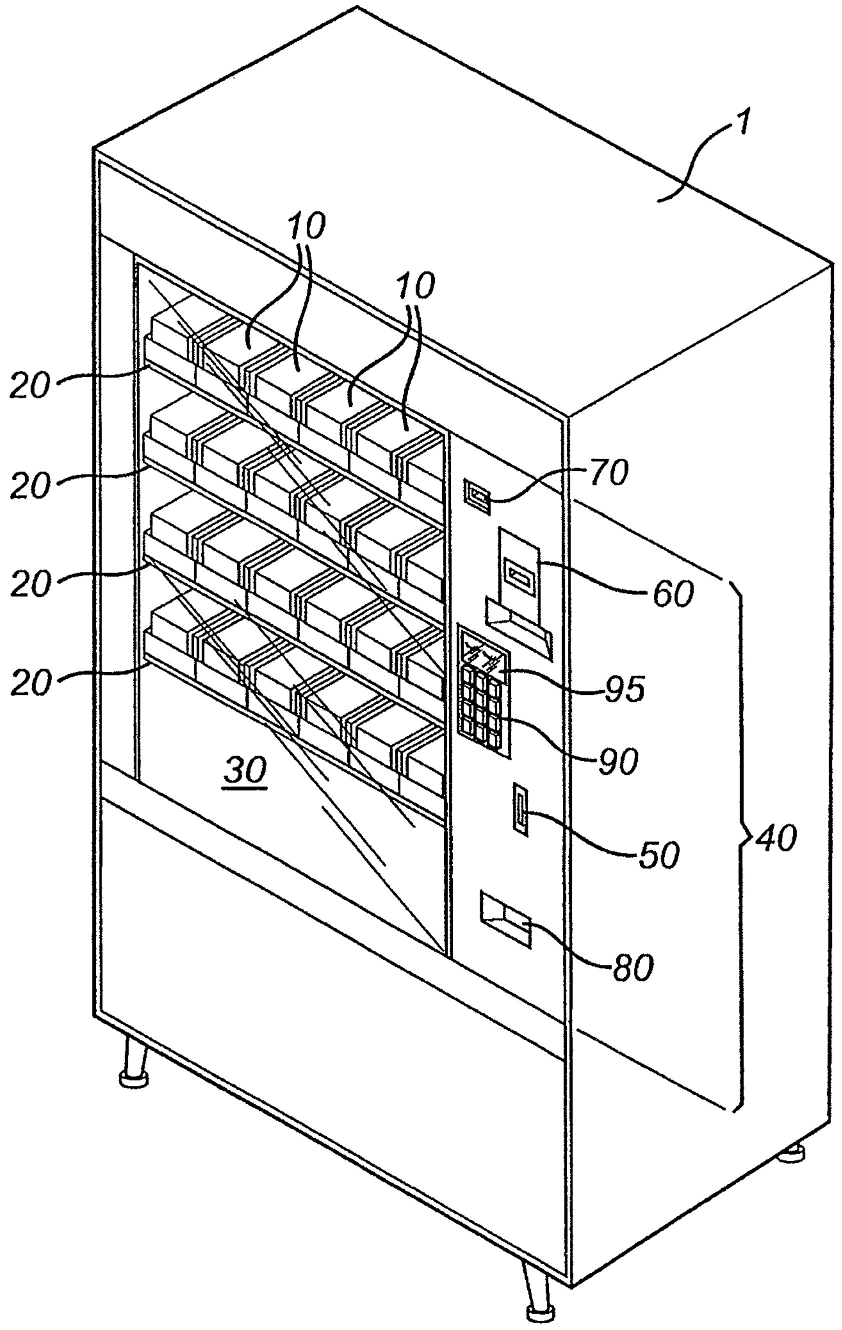
FIG. 1 (Prior Art)
FIG. 1 shows a perspective view of a conventional vending machine using keypad.
Figure 2:
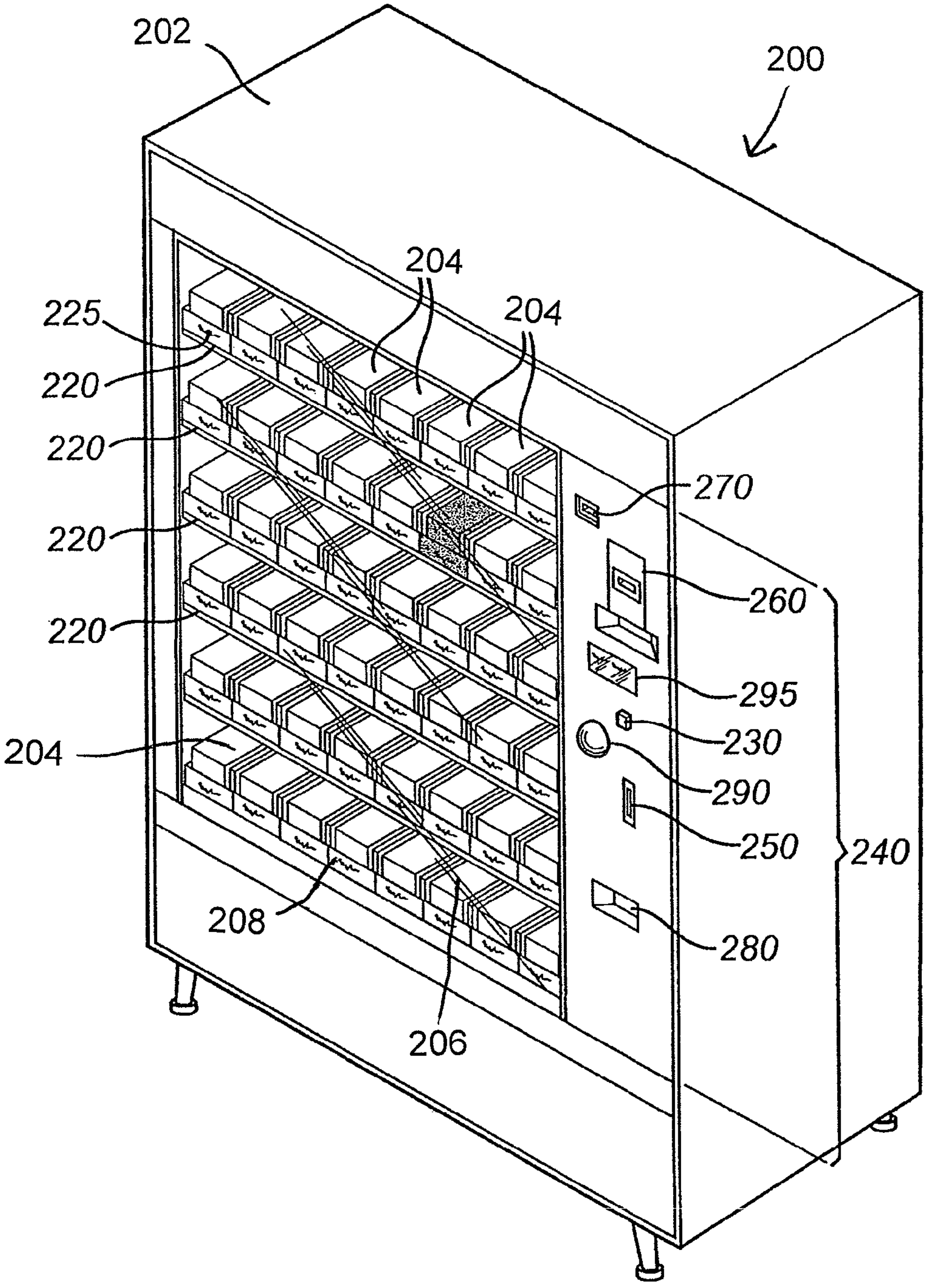
FIG. 2 shows a perspective view of a dispensing machine containing items in accordance with the present invention and FIG. 2A shows a perspective view of the the dispensing machine without items.
Figure 2A:
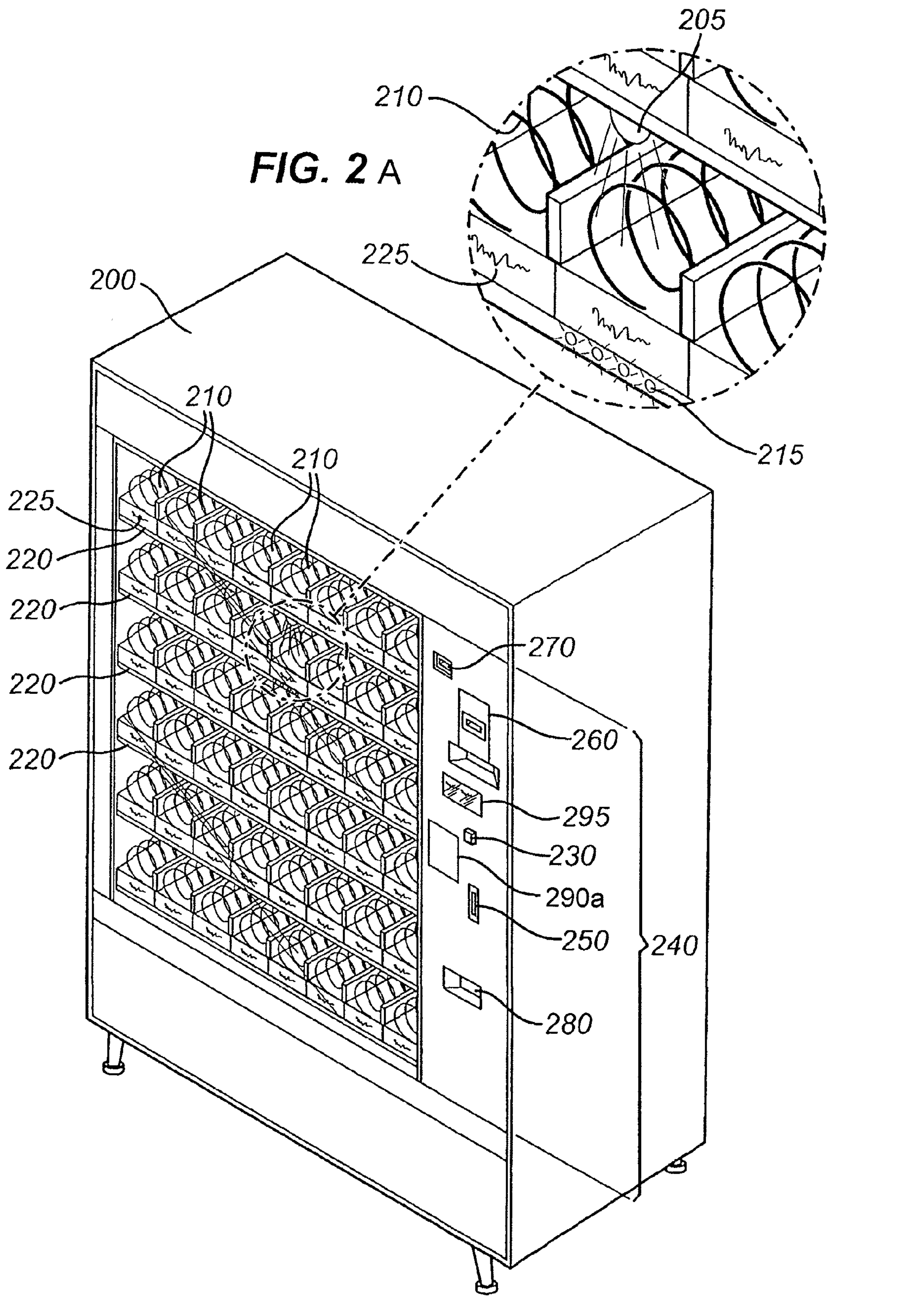

FIGS. 2, 2A illustrates an embodiment of a spiral dispensing machine 200 in accordance with the present invention. The dispensing machine 200 comprises a cabinet 202 retaining a plurality of different items 204. The cabinet 202 has a window 206; the window is generally transparent through which the items are viewable to the customer. Inside the cabinet is a plurality of support shelves 220 for supporting the items and a plurality of dispensing spirals 210. The dispensing machine as shown in FIG. 2 contains 6 by 8 compartments 208 of different items. Price tags 225 may also be attached below each compartment of items.

In one embodiment, the dispensing machine 200 has a customer interface comprising various means for the customer to interact with the machine 200. FIG. 2 shows an exemplary customer interface 240 in a dispensing machine for vending items. The customer interface 240 comprises a coin slot 250; banknote or bill slot 260; card acceptor 270 and coin return recess 280. The customer interface 240 further comprises a pointing device 290, a display 295 for displaying information relating to items or instructions for operating the machine, and a dispensing button 230.

Figure 2B:
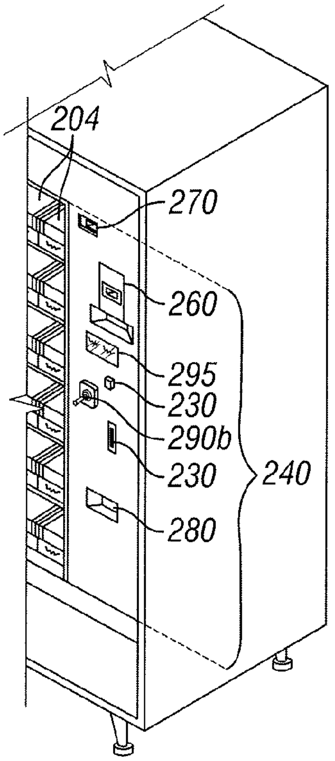
FIGS. 2B-2D show a perspective view of various embodiments of the pointing device of the present invention.
Figure 2C:
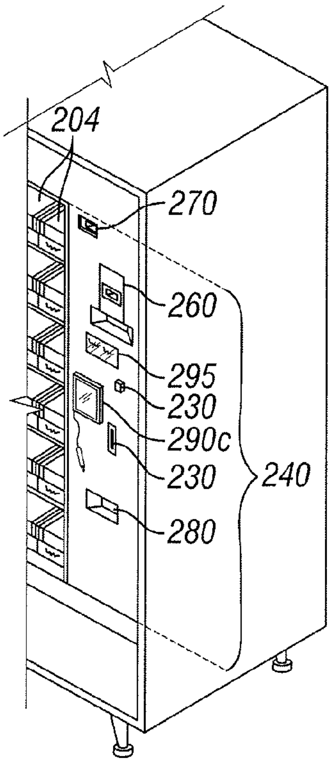
Figure 2D:
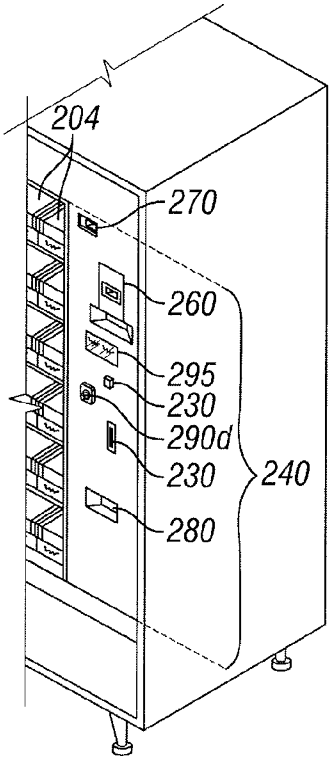
Figure 2E:
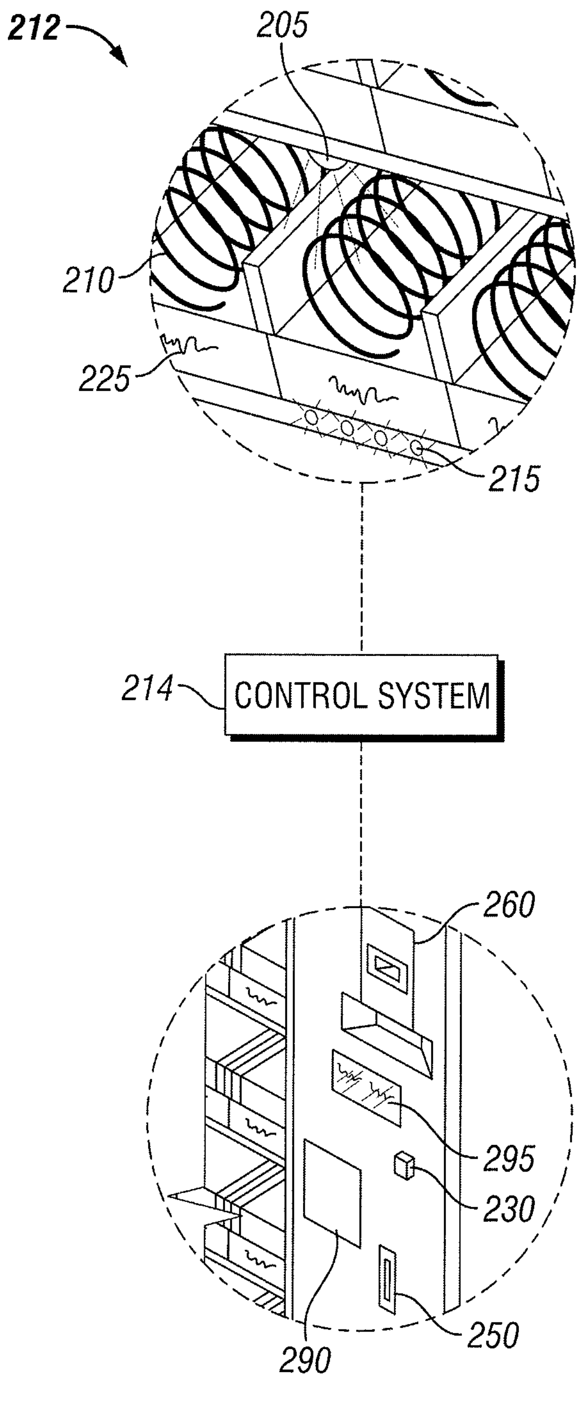
FIG. 2E shows a partial view of an indicator, control system and pointing device of the present invention.

The pointing device 290 is an input interface that allows a user to input spatial data which can then be recognised and processed by a computer. Typical pointing devices include computer mice, roller balls 290, touch pads or touch screens 209*a*, graphics tablets 209*c*, joysticks 209*b* pointing sticks 290*d*, light pens, etc. See FIGS. 2B-2D. In an exemplary embodiment of the present invention, the pointing device comprises a roller ball 290. A roller ball generally includes a rotateable ball partially housed in a housing. The housing generally further contains sensors to detect rotation and position of the ball and supporting circuitries to communicate the input signal to a control system. A user may use thumb, fingers, or the palm of the hand to rotate the ball.

Using a pointing device for selection can improve the speed of selection, especially compared to a conventional keypad. It can also increase the fun of control for the customer during selection. Other advantages of using a pointing device include that it can be easily build into a console and cannot be easily vandalised. Further, the pointing device, such as a roller ball, can be designed to occupy only a small area on the customer interface and thus the size of the customer interface can be advantageously reduced. The cost of manufacture may also be reduced.

It should be noted that other pointing devices can also be used in the dispensing machine of the present invention. Other suitable pointing devices include, but are not limited to, touch pads, touch sensitive glass screens, joysticks and pointing sticks.

Another object of the present invention is provide a localised indication of the selected item to the customer which is absent from the art. This is achieved by having an indicator in the machine to locally highlight the selected item. A suitable indicator 212 comprises an illuminator 205, 215 which illuminates the selected item or the corresponding compartment. More specifically, the indicator 212 is associated with the pointing device 290 such as the above mentioned roller ball. Both the indicator 212 and the pointing device 290 are connected to a control system 214. See FIG. E. As the sensor attached to the roller ball senses the rotation and position of the ball and communicates this information to the control system, the control system controls an illuminating circuit to illuminate the selected item or the corresponding compartment.

Referring to FIG. 2A, the inset illustrates an exemplary indicator that may be used in each of the compartments. The selected item is illuminated in response to the control of the pointing device, providing a direct indication and clear view of the selected item to the customer. This assists the customer to select the desired item and increase the accuracy of selection.

The indicator may suitably comprise an illuminator. In an exemplary embodiment according to the present invention, each compartment of items is equipped with a downward facing light 205, e.g. a LED, to illuminate the item from above. Each compartment is additionally equipped with a forward facing light 215, e.g. a LED, to 'underline' the item. FIG. 2A shows a detailed exemplary embodiment in which one focused LED 205 is used to illuminate the item from above and four diffused LEDs 215 are used to underline the item.

In an idle state of the machine, the illuminator may also be used to produce various static or dynamic illumination patterns to attract customers.

Figure 3:
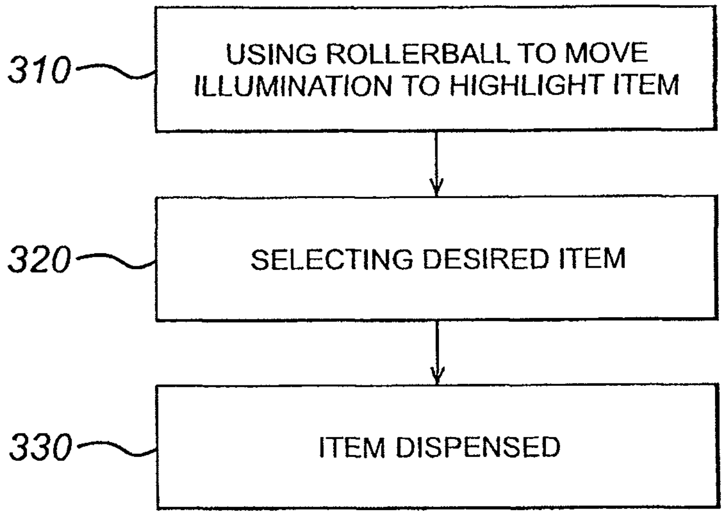
FIG. 3 shows a flowchart of a method of operating a dispensing machine in accordance with the present invention.

In another aspect of the present invention, there is provided method for operating a dispensing machine. FIG. 3 illustrates an exemplary process of operating a dispensing machine in accordance with the present invention. The process includes the steps that the customer uses a pointing device, e.g. a roller ball, to move an illumination to highlight the selected item 310, giving a dispensing instruction for a desired item 320 and collecting the dispensed item 330.

Figure 4:
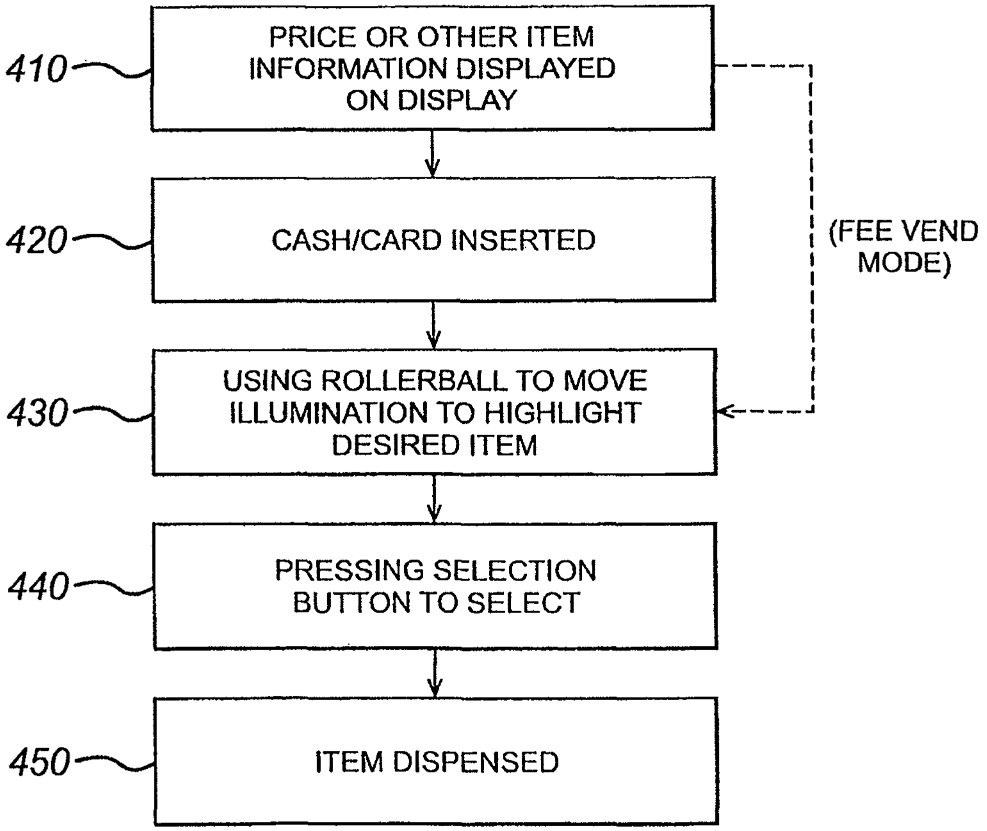
FIG. 4 shows a flowchart of a detailed method of operating a dispensing machine in accordance with the present invention.

FIG. 4 shows a more detailed exemplary method of operation. The customer approaches the dispensing machine in which item prices are displayed below the corresponding items 410. If the machine is a vending machine, the customer then inserts coin, banknote or bankcard into the corresponding slots 420. Using a pointing device, e.g. a roller ball, the customer moves illumination to highlight the selected item 430. The item will then be dispensed to a discharge area 450 from where it can be removed by the customer.

FIG. 4 also shows another embodiment of operation in which the customer needs to give a dispensing instruction 440, for example by pressing a dispensing button, to initiate the item dispensing. FIG. 4 shows yet another embodiment of operation in which the customer needs not to make payment for the desired item while the dispensing machine works in a free vending mode.

Figure 5:
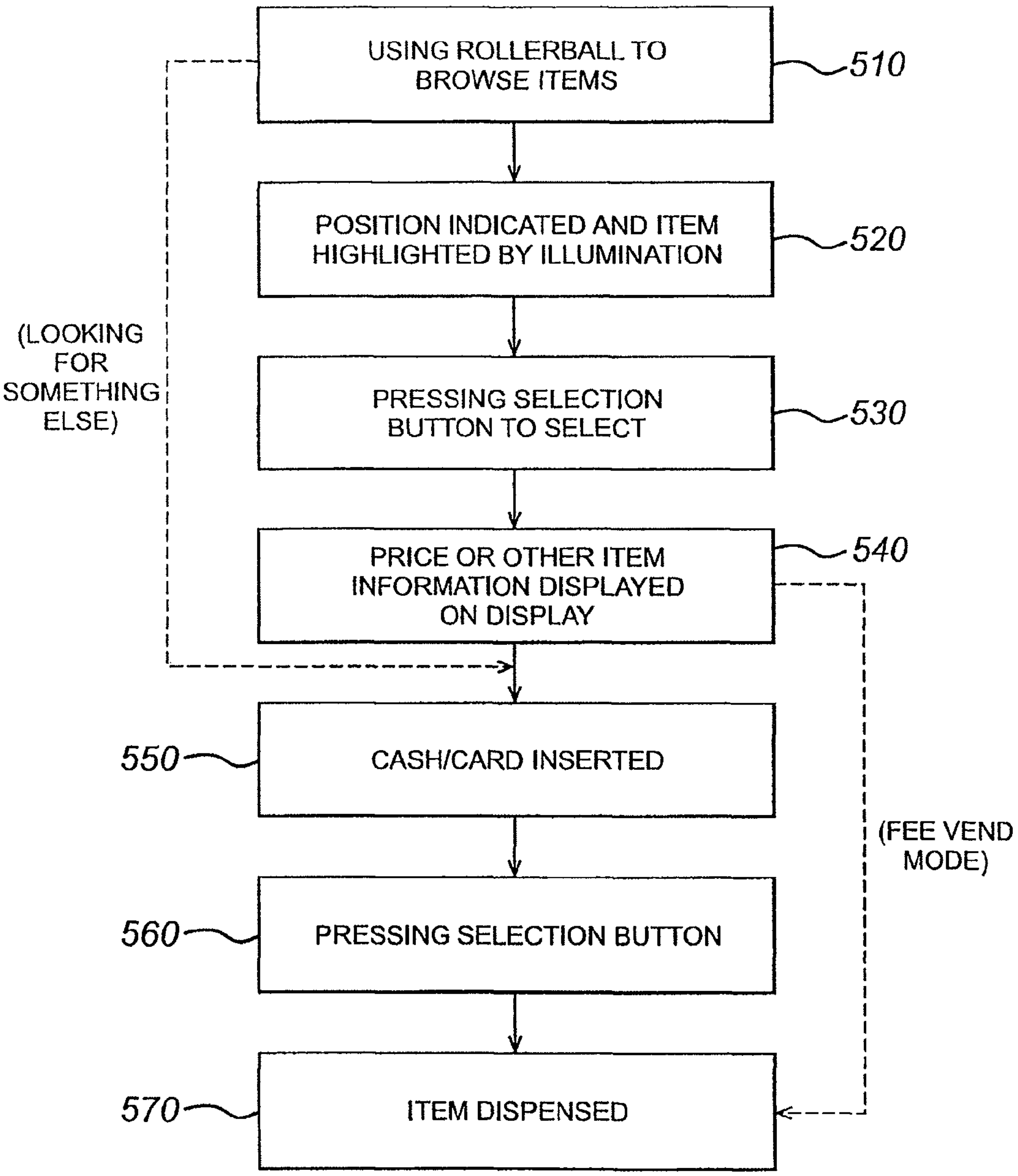
FIG. 5 shows a flowchart of another detailed method of operating a dispensing machine in accordance with the present invention.

FIG. 5 shows another detailed exemplary method of operation. The customer approaches the dispensing machine and uses a pointing device, e.g. a roller ball, to browse items 510, position and/or rotation of the roller ball being simultaneously indicated by illumination over the corresponding item 520. As the item is illuminated, the price or other item information will be displayed on a display 530. The customer may also go back to step 510 to browse items again if he/she is looking for some other item. The customer then inserts coin, banknote or bankcard into the slots 540 if the item is for vending. The item will then be dispensed to a discharge area 560. In another embodiment, the customer may need to give a dispensing instruction 550, for example by pressing the dispensing button, to initiate the item dispensing.

It should be noted that the roller ball and LED illuminator are described above and shown in the figures only as suitable embodiments. Other types of pointing devices and/or other types of indicators which are operable to provide selectively localised indication, visible to the customer through the window, to show the item corresponding to the input from the pointing device can also be used. In addition, vending machine is an exemplary field of application only. It should be understood that the present invention can be applied to other types of dispensing machines for other purposes.

What is claimed is:

1. A dispensing machine for dispensing items to customers, the dispensing machine comprising:

a cabinet having at least one window;

a plurality of supports for supporting a plurality of different items to be dispensed to customers;

a pointing device operable to select a desired item from the plurality of items, wherein the pointing device consists of a human interface device that allows a user to input spatially continuous and multi-dimensional data using physical gestures;

an indicator associated with the pointing device and operable to provide an indication, visible through the window, of which item is being selected by the pointing device without dispensing said selected item; and a dispensing mechanism operable to dispense the selected item in response to a dispensing instruction.

2. The dispensing machine of claim 1 further comprising a control system operably connected to the pointing device and the indicator, wherein the control system, in response to a signal from the pointing device, controls the indicator to provide an indication, visible through the window, of which item is being selected by the pointing device.

3. The dispensing machine of claim 1, wherein the pointing device is selected from the group consisting of a roller ball, a touch pad, a touch sensitive transparent window, a joystick, or a pointing stick.

4. The dispensing machine of claim 3, wherein the pointing device comprises a roller ball to control selection of the items.

5. The dispensing machine of claim 3, wherein the pointing device comprises a touch pad.

6. The dispensing machine of claim 1, further comprising an illuminator to illuminate the item being selected by the pointing device.

7. The dispensing machine of claim 6, wherein the illuminator comprises a downward facing light to illuminate the selected item from above.

8. The dispensing machine of claim 6, wherein the illuminator comprises a forward facing light adjacent to the selected item.

9. The dispensing machine of claim 7 and 8, wherein the light comprises a LED.

10. The dispensing machine of claim 1, further comprising a display for displaying information relating to the selected item or instructions for operating the machine to the customers.

11. The dispensing machine of claim 1, wherein the dispensing mechanism comprises a plurality of dispensing spirals.

12. A method for operating a dispensing machine for dispensing items to customers, the method comprising the steps of:

using a pointing device for selecting a desired item wherein the pointing device consists of a human interface device that allows a user to input spatially continuous and multi-dimensional data using physical physical gestures, the selection comprising moving an indicator, wherein the indicator is operable to provide an indication, visible to customers through at least one window of the dispensing machine, to show which item is being selected by the pointing device without dispensing said selected item; and dispensing a selected item in response to a dispensing instruction.

13. The method of claim 12 further comprising browsing items through control of the pointing device.

14. The method of claim 12, wherein the indicator provides an indication visible to customers by locally illuminating the selected item.

15. The method of claim 12, further comprising displaying information relating to the items or instructions for operating the machine to the customers.

* * * * *

UNITED STATES PATENT AND TRADEMARK OFFICE

CERTIFICATE OF CORRECTION

PATENT NO. : 8,527,089 B2
APPLICATION NO. : 13/054820
DATED : September 3, 2013
INVENTOR(S) : Meacock et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 334 days.

Signed and Sealed this
Fifteenth Day of September, 2015

Michelle K. Lee
*Director of the United States Patent and Trademark Office*